United States Patent [19]

Pearce et al.

[11] 3,910,651
[45] Oct. 7, 1975

[54] SHAFT BEARING ASSEMBLIES

[75] Inventors: Bryan Robert Pearce; Douglas William Daniels, both of Bristol, England

[73] Assignee: Rolls-Royce (1971) Limited, London, England

[22] Filed: Nov. 13, 1973

[21] Appl. No.: 415,343

[30] Foreign Application Priority Data
Nov. 24, 1972 United Kingdom............... 54476/72

[52] U.S. Cl................................ 308/26; 308/187.1
[51] Int. Cl.[2]......................................... F16C 27/00
[58] Field of Search...... 308/26, 178, 184 R, 184 A, 308/187.1

[56] References Cited
UNITED STATES PATENTS
3,357,757 12/1967 Morley et al. .......................... 308/26
3,473,853 10/1969 Goss et al. .................. 308/184 R X Primary Examiner—Robert S. Ward, Jr.
Assistant Examiner—Gene A. Church
Attorney, Agent, or Firm—Stevens, Davis, Miller & Mosher

[57] ABSTRACT

A shaft bearing assembly is designed to allow for transverse movements of the shaft relative to fixed structure, and the bearing seal is constructed in two parts, a first part between relatively rotating components of the assembly, and a second part between relatively non-rotating components of the assembly, the second part being adapted to allow for the transverse movements of the shaft.

11 Claims, 3 Drawing Figures

SHAFT BEARING ASSEMBLIES

This invention relates to shaft bearing assemblies and especially to the sealing of bearing assemblies for use with rotating shafts that may be subject to the sudden application of large radial loads.

In a gas turbine engine wherein a fan shaft drivingly connects a fan of relatively large diameter to a turbine, provision has to be made to accommodate any sudden large radial loads that are applied to the shaft. Such radial loads may, for example, arise during a heavy landing by an aircraft in which the engine is installed, or by the loss of blades from the fan during rotation thereof, such loss may occur following the ingestion of a bird.

It is known to support the shaft by a bearing situated close to the fan and to provide means for allowing the bearing to make limited radial movements away from its normal operating position under the effects of a suddenly applied radial load, resilient and or damping means being provided to resist said radial movements of the bearing. Thus the radial loads can be accomplished without imparting very large impulsive, and consequently damaging, force to the structure of the engine. The radial load due to loss of blading may be resisted by inversion of the shaft, by which is meant the stable rotation of an unbalanced shaft and rotor system that may be achieved, at rotational speeds greater than the critical frequency of the shaft, by deflection of the shaft.

In a typical installation in a gas turbine engine, the fan shaft is additionally supported by two roller bearings, one close to the turbine and the other intermediate the fan and the turbine.

The deflection of a typical fan shaft during inversion changes with the unbalanced force that is acting on it but characteristically the shaft remains substantially undisplaced at the two roller bearings which act as node points and the shaft is deflected from its normal operational position between the two node points and at the thrust bearing.

In a conventional seal for such a shaft bearing arrangement, the two elements of the seal are connected one to the shaft or bearing inner race and the other to the fixed structure which carries the bearing outer race. Where the bearing can move relative to the fixed structure, however, excessive movements will cause rubbing and possible destruction of the relatively rotating seal components.

The present invention has for its object the provision of a shaft bearing assembly in which this difficulty is overcome.

According to the present invention a shaft bearing assembly comprises a shaft member, a structural member and a bearing for supporting the shaft member for rotation relative to the structural member, the bearing having first and second races, means for mounting one of the bearing races on the shaft member and the structural member repectively, said mounting means including means for allowing relative transverse movement between one of the races and its respective member and means for resisting said movement, wherein there is provided a first seal having components connected for movement with each of the bearing races to form a seal across the bearing, and a second seal having components respectively connected to that bearing race and that member between which said relative movement takes place, said second seal including means whereby the transverse movement can be accommodated while maintaining the seal.

By this means the sealing function is split into two parts and no relative transverse movement takes place between relatively rotating components of a seal.

In one embodiment of the invention the shaft bearing assembly supports the fan of a ducted fan gas turbine engine and the structural member is a static structure.

The means for allowing the transverse movement between a bearing race and its respective member may be a hydro-dynamic squeeze film or a spring.

The first seal is preferably a labyrinth seal which provides a seal against leakage of oil from the bearing, and is preferably formed in two parts in series, and a supply of pressurized air is provided in between the two parts.

The second seal is also preferably a floating ring seal and is also preferably formed in two parts in series and seals the air supply to the labyrinth seals and may also seal the squeeze film.

In a preferred embodiment parts of the first and second seals are formed on a single common member attached to one of the bearing races.

An embodiment of the invention will now be described, by way of example only, with reference to the accompanying drawings wherein.

Figure 1:
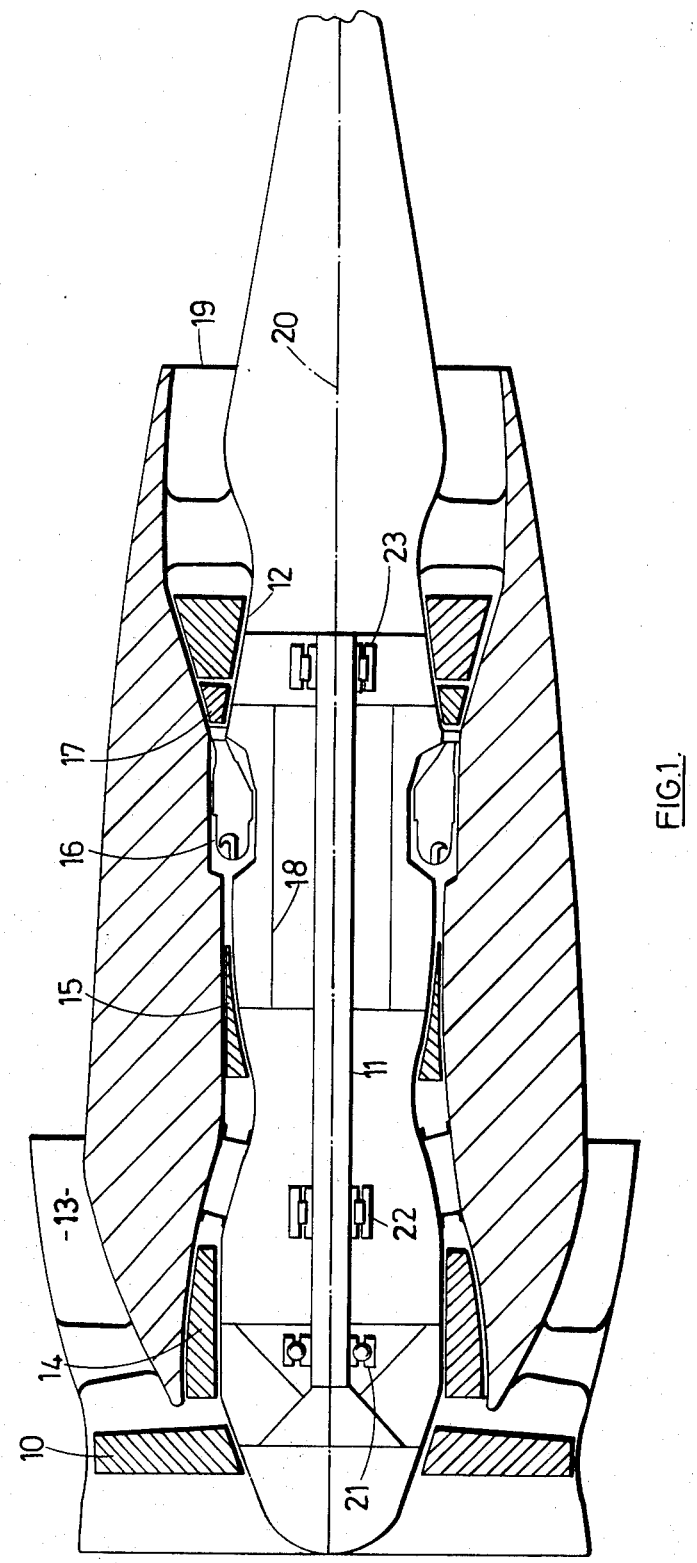
FIG. 1 is a longitudinal section through a front fan gas turbine engine.

In FIG. 1 a gas turbine engine is generally illustrated in which a front fan 10 is drivingly connected by a shaft 11 to a low pressure turbine 12 and delivers compressed air to a bypass duct 13 and to intermediate and high pressure compressors 14 and 15 respectively. The output from the high pressure compressor enters a combustor 16 wherein it is mixed with fuel and the mixture is burned. The products of combustion drive a high pressure turbine 17 and the low pressure turbine 12, before being exhausted through the nozzle 19. The high pressure compressor is driven by the high pressure turbine via a shaft 18.

The shaft 11 which drives the fan and the intermediate compressor is supported for rotation about an axis 20 by a first bearing 21, which is a thrust bearing and is situated adjacent the fan 10. A second bearing 22 is provided remote from the fan, and a third bearing 23 is provided at a further distance from the fan.

The first bearing is adapted by means later described to allow the shaft 11 to invert should the fan 10 become unbalanced and the second bearing 22, which is a roller bearing, is adapted to allow the shaft to rotate therein about its altered axis during and after inversion by placing it on the shaft at the most likely position of the second node point. The slope of the shaft at this point is a maximum but its displacement from the normal shaft axis 20 is a minimum. It is found that if the second bearing is supported by a hydrodynamic squeeze film the clearance in the squeeze film is sufficient to accommodate the slope of the shaft.

Figure 2:
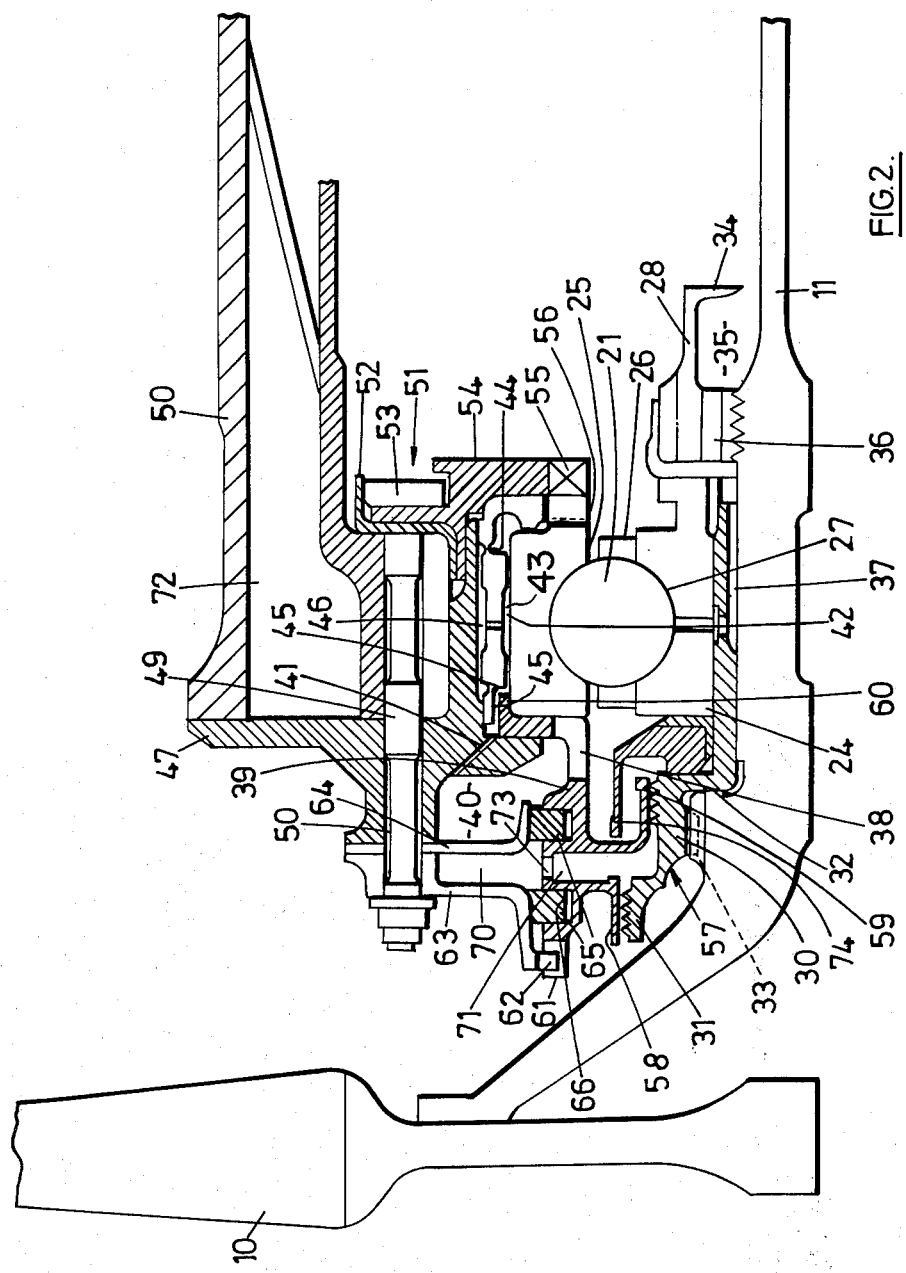
FIG. 2 is an enlarged view of the fan shaft and thrust bearing of FIG. 1 showing a sealing arrangement according to the invention.

Referring now to FIG. 2 the thrust bearing 21 comprises an inner race 24 an outer race 25 and a cage 26 there-between for retaining the balls 27.

The outer race is mounted in a housing 47 attached by bolts 49 to a structure 50 connected to the engine casing (not shown).

A two piece bolt trap illustrated generally at 51 has a first portion 52 which prevents the heads 53 of the bolts 49 from turning and a second portion 54 which is provided with dogs 55 which engage dogs 56 on the outer race to prevent rotation thereof. The portion 54 also restrains rearward movement of the thrust bearing.

The inner race 24 is secured to the shaft 11 by a nut 28 which also clamps the radially inner elements 30, 31 of a labyrinth seal against a shoulder 32 on the shaft. Shallow splines 33 positively drive the inner elements of the labyrinth seal and thus obviate the possibility of them skidding. The nut 28 has a flange 34 which, during rotation of the shaft retains a reservoir of oil in the annular space 35 and under the centrifugal field this oil is pumped via drillings 36 in the nut, and oilways 37, to the bearing.

Oil leaving the bearing 21 passes through ports 38 in a member 39 into the annular space 40 and from there via drillings 41 to the space 42 in which a hydrodynamic squeeze film is maintained to damp the normal vibrations of the shaft and bearing assembly. The hydrodynamic squeeze film space 42 is bounded on one side by the bearing outer race and on the other side by a frangible portion 43 having two annular shear necks, 44, 45 which, as described and claimed in our co-pending application No. shear under the effects of a suddenly applied radial load. Following shearing of the two necks a second squeeze film in a space 46 between the frangible portion 43 and the bearing housing 47 becomes operable to damp the movement of the bearing.

The bearing is now able to move radially by an amount equal to the sum of the radial clearances in the two squeeze film spaces.

Thus the bearing 21 is spaced from the structure 50 for movement relative thereto and hydrodynamic squeeze film means are provided for resisting said movement.

The sealing of the bearing arrangement described above presents a problem because of the extent of the radial movement permitted. This problem has been solved by using two stages of sealing.

A first seal 57 is formed between the bearing outer race 25 and the shaft 11 by attaching the outer elements 58, 59 of the labyrinth seals directly to the outer race of the bearing for movement therewith. This is done by forming the outer elements 58, 59 of the labyrinth seal on the member 39 which is attached to the outer race 25 by an interference fit at 60. The member 39 is prevented from rotating by dogs 61 which engage dogs 62 on a flange 63 attached to the bearing housing. Sufficient clearance is provided between the dogs to accommodate the relative radial movement of the bearing housing.

Thus the outer seal elements 58, 59 correspond with the inner seal elements 31, 30 respectively on the shaft to form the first seal 57.

A second seal is provided consisting of a pair of piston ring seals 65 capable of moving radially in grooves 66 in the member 39. A first one of the seals 65 seals against an axial extension of flange 63 while the second one of the seals 65 seals against an axial extension of a flange 64. The two flanges 63 and 64 are attached to the static structure 50 by the bolts 49. Each ring has a scarfed joint at one point on its circumference to enable assembly of it into its respective groove. This form of seal allows relative movement between the member 39 and the static structure.

Although in this embodiment the member 39 carries seal elements for the first seal on its radially inner face and seal elements for the second seal on its radially outer face it will be readily appreciated that the first and second seal elements respectively may be separately attached to the bearing outer race.

Both the first and second seals are actually two seals in series. By this means the joint effectiveness of the sealing elements is improved and also passages 70, 71 can be provided between the seals through which pressurized air, is fed to the seals. This pressurized air which may be bleed air from a compressor of the engine can be fed to the space 72 in the structure and then via drillings (not shown) to the passage 70, and via the drilling 73 to the second passage 71. In this way pressurized air can be supplied to blow the sealing elements and prevent the escape of lubricant from the bearing. A splash guard 74 prevents lubricant coming directly into contact with the first seal.

The circumferential clearance between the mating dogs 61, 62 should be greater than the circumferential clearance between the mating dogs between the thrust bearing and bolt trap to the extent necessary to ensure that it is the bolt trap that restricts rotation of the thrust outer race.

Figure 3:
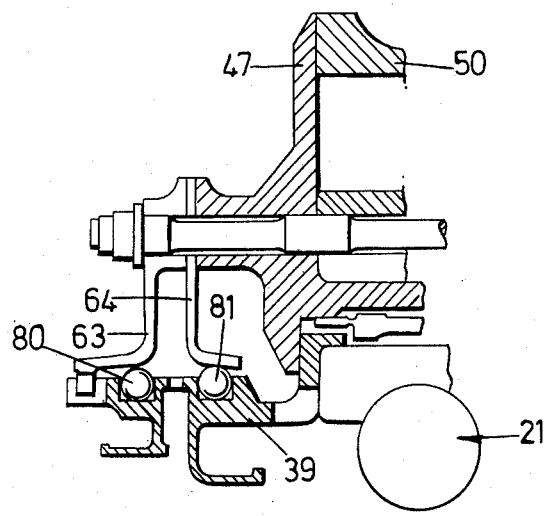
FIG. 3 is a view of an alternative sealing arrangement.

In FIG. 3 an alternative form of the second seal is detailed. In this embodiment 'O' ring seals, 80, 81 respectively, replace the piston ring seals, 65. The material for these ring seals must be carefully chosen to ensure it is suitable for prolonged operation at the temperatures and environment associated with the lubricant and the pressurised air.

It will be readily appreciated that the double seal arrangement of the invention may be applied to any bearing wherein radial movement of a bearing is desired. For example, the invention may be applied to a bearing having a single hydrodynamic squeeze film on the outer race, and where it is desired to use a smaller radial clearance between the members of a labyrinth seal than the clearance provided in the hydrodynamic squeeze film.

It will be appreciated that the invention need not be restricted to labyrinth and ring seals and for example it may be desirable to use a lip seal between the inner and outer races of the bearing.

In a modification means may be provided to urge each ring 65 against one side of its respective groove, thereby maintaining the sealing properties during starting of the engine when the supply of pressurized air to the passage 70 is insufficient. Such means may for example comprise a Belville type washer, one of which is installed in each groove 67 so as to urge the two rings apart.

In one known shaft and bearing assembly spring means are interposed between the bearing and the fixed structure for resisting relative movement between the bearing and the structure, and for damping the vibrations of a shaft carried by the bearing. It will be understood that the present invention is readily applicable to such a shaft and bearing assembly, and that it may be desired to interpose the spring means between the shaft and the bearing. In this case relative movement between the bearing and the shaft is possible and it is therefore necessary to provide means for allowing relative movement between the first seal element and the shaft.

It will be further understood that embodiments of the invention are possible in which the bearing is for example a phosper bronze bush or a guide and wherein the shaft moves relative to the bush for example by sliding axially or executing a helical motion.

What we claim is:

1. A shaft bearing assembly comprising a shaft member, a structural member and a bearing for supporting the shaft member for rotation relative to the structural member, the bearing having first and second races, means for mounting one each of the bearing races on the shaft member and the structural member respectively, said mounting means including means for allowing relative transverse movement between one of the races and its respective member and means for resisting said movement, wherein there is provided a first seal having components connected for movemenet with each of the bearing races for form a seal across the bearing, and a second seal having components respectively connected to that bearing race and that member between which said relative movement takes place, said second seal including means whereby the transverse movement can be accommodated while maintaining the seal.

2. A shaft bearing assembly according to claim 1 and in which the shaft bearing assembly supports the fan of a ducted fan gas turbine engine and the structural member is a static member.

3. A shaft bearing assembly according to claim 1 and in which the first seal is a labyrinth seal.

4. A shaft bearing assembly according to claim 1 and in which the first seal comprises a pair of labyrinth seals in series, and means are provided for supplying air under pressure between the seals.

5. A shaft bearing assembly according to claim 1 and in which the second seal is a ring seal.

6. A shaft bearing assembly according to claim 1 and in which the second seal comprises a pair of ring seals in series.

7. A shaft bearing assembly according to claim 1 and in which the bearing race which is allowed transverse movements relative to its respective structure carries a member which is common to both seals and carries one component of each seal.

8. A shaft bearing assembly according to claim 1 and in which the bearing race which is allowed transverse movements relative to its respective structure is the outer race of the bearing.

9. A shaft bearing assembly according to claim 1 and in which the means resisting the relative transverse movement between the bearing race and its respective structure comprises a hydro-dyanmic squeeze film of oil.

10. A shaft bearing assembly according to claim 1 and inwhich the means for resisting the relative transverse movement between the bearing race and its respective structure comprises a spring.

11. A shaft bearing assembly comprising:
a shaft member,
a structural member,
a bearing supporting said shaft member for rotation relative to said structural member, said bearing having first and second races,
means for mounting said first and second bearing races on said shaft and said structural members, respectively, said mounting means including means for allowing relative transverse movement between one of said races and its respective member and means for resisting said movement,
a first seal connected for movement with each of said bearing races to form a seal across said bearing,
a second seal connected to the bearing race and member between which said relative movement takes place, said second seal including means whereby said transverse movement can be accommodated while maintaining said seal, said structural member defining a cavity large enough to allow said bearing race to move transversely under both normal out-of-balance loads and excessive loads, and
means for damping both small and large movements of the race produced by said loads.

* * * * *